(12) United States Patent
Lee

(10) Patent No.: US 10,851,700 B2
(45) Date of Patent: Dec. 1, 2020

(54) COOLANT CONTROL VALVE AND COOLING SYSTEM HAVING THE SAME

(71) Applicants: HYUNDAI MOTOR COMPANY, Seoul (KR); KIA MOTORS CORPORATION, Seoul (KR)

(72) Inventor: Hyo Jo Lee, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 257 days.

(21) Appl. No.: 15/836,164

(22) Filed: Dec. 8, 2017

(65) Prior Publication Data
US 2019/0128172 A1    May 2, 2019

(30) Foreign Application Priority Data
Oct. 26, 2017    (KR) .................. 10-2017-0140084

(51) Int. Cl.
| | |
|---|---|
| *F01P 7/16* | (2006.01) |
| *F16K 31/04* | (2006.01) |
| *F01P 3/02* | (2006.01) |
| *F16K 31/524* | (2006.01) |
| *F16K 11/16* | (2006.01) |
| *F01P 7/14* | (2006.01) |

(52) U.S. Cl.
CPC ................... *F01P 7/16* (2013.01); *F01P 3/02* (2013.01); *F16K 11/165* (2013.01); *F16K 31/04* (2013.01); *F16K 31/52416* (2013.01); *F01P 2003/021* (2013.01); *F01P 2003/024* (2013.01); *F01P 2007/146* (2013.01)

(58) Field of Classification Search
CPC .......... F01P 7/16; F01P 3/02; F01P 2003/024; F01P 2007/146; F01P 2003/021; F16K 11/165; F16K 31/52416; F16K 31/04
See application file for complete search history.

(56) References Cited

U.S. PATENT DOCUMENTS

| 1,929,054 A | * | 10/1933 | Carmody | ............... F16K 11/165 |
| | | | | 137/630.16 |
| 3,184,214 A | * | 5/1965 | King | ................... F16K 31/5284 |
| | | | | 251/229 |
| 3,260,131 A | * | 7/1966 | Miles | ...................... F15B 13/02 |
| | | | | 74/608 |

(Continued)

FOREIGN PATENT DOCUMENTS

KR    10-2010-0117909 A    11/2010

*Primary Examiner* — Joseph J Dallo
*Assistant Examiner* — Kurt Philip Liethen
(74) *Attorney, Agent, or Firm* — Morgan, Lewis & Bockius LLP

(57) ABSTRACT

A coolant control valve unit for a vehicle is disclosed. The coolant control valve unit includes a cam having an upper surface to which a driving axle is connected and a lower surface having at least one sloped surface with a profile set in a rotation direction on the basis of the driving axle, a valve provided in a rod supported on one side of the sloped surface, an actuator rotating the driving axle to push the rod along the profile of the sloped surface of the cam to cause the valve to open and close a coolant passage, a cam cover supporting an upper surface of the cam, and an annular cam bearing interposed between the cam cover and the cam, excluding a central region in which the driving axle is formed.

12 Claims, 6 Drawing Sheets

(56) References Cited

U.S. PATENT DOCUMENTS

| | | | | | |
|---|---|---|---|---|---|
| 3,908,038 | A | * | 9/1975 | Nienart | C08L 27/18 427/485 |
| 4,192,348 | A | * | 3/1980 | Hansen | F16K 31/04 137/624.15 |
| 4,301,830 | A | * | 11/1981 | Keller | F16K 11/18 137/454.6 |
| 6,896,491 | B2 | * | 5/2005 | Trubnikov | F16C 35/04 384/537 |
| 2012/0279462 | A1 | * | 11/2012 | Warnery | F01P 11/16 123/41.08 |
| 2013/0330213 | A1 | * | 12/2013 | Pilcher | F04B 27/08 417/269 |
| 2014/0171249 | A1 | * | 6/2014 | Kullin | F16H 1/32 475/162 |
| 2015/0069278 | A1 | * | 3/2015 | Kopp | F16K 31/042 251/129.07 |
| 2016/0084143 | A1 | * | 3/2016 | Lee | F01P 7/165 123/41.08 |

\* cited by examiner

COOLANT CONTROL VALVE AND COOLING SYSTEM HAVING THE SAME

CROSS-REFERENCE TO RELATED APPLICATION

This application claims priority to and the benefit of Korean Patent Application No. 10-2017-0140084 filed in the Korean Intellectual Property Office on Oct. 26, 2017, the entire contents of which are incorporated herein by reference.

BACKGROUND

(a) Field

The present disclosure relates to a coolant control valve unit receiving a coolant discharged from an engine and distributing the received coolant to coolant components, and a cooling system having the same.

(b) Description of Related Art

An engine generates turning power as fuel is burned, and discharges a combustion gas. In particular, an engine coolant circulates the engine to absorb heat energy and outwardly dissipates absorbed heat through a radiator.

When a temperature of a coolant of the engine is low, viscosity of oil may be increased to increase a frictional force and fuel consumption, lengthen an activation time of a catalyst, and degrade quality of an exhaust gas.

When the temperature of the coolant of the engine is too high, knocking occurs, and in order to suppress occurrence of knocking, an ignition time may be adjusted, but, in this case, performance may be degraded. Also, when a temperature of a lubricant is too high, a lubricating operation may be degraded.

The above information disclosed in this Background section is only for enhancement of understanding of background of the invention. Applicant notes that this section may contain information available before this application. However, by providing this section, Applicant does not admit that any information contained in this section constitutes prior art.

SUMMARY

Technology for controlling temperatures of several cooling components through a single coolant control valve unit, such as maintaining a coolant of a specific portion of the engine at a high temperature and a coolant of other portions at a low temperature, has been applied. For example, since a cylinder head has a relatively high temperature, a coolant is allowed to flow to the cylinder head all the time, while flow of a coolant for a cylinder block may be controlled according to temperatures of the coolant.

The coolant control valve unit controls coolants circulating an engine (an oil cooler, a heater, an exhaust gas recirculation (EGR) cooler, etc.), a radiator, and the like, respectively, enhancing overall cooling efficiency of the engine and reducing fuel consumption.

Thus, a temperature of a coolant at a set position is sensed using a coolant temperature sensor, a target coolant temperature is set according to operating conditions, and the coolant control valve unit is controlled according to the target coolant temperature.

The coolant control valve unit includes a rotary valve type and a cam type. In the rotary valve type coolant control valve unit, a pipe-type rotary valve is rotated and an opening rate of a coolant passage formed in the rotary valve. In a cam type coolant control valve unit, a sloped surface with a predetermined profile is formed on one surface of a cam, and an opening rate of a coolant passage is controlled by pushing a rod with a valve by rotating the cam.

Meanwhile, in a cam type coolant control valve unit, an upper surface of the cam and a lower surface of the cam cover are in contact, and thus, friction and wear occurs between the cam and the cam cover as the cam rotates. Accordingly, operating torque of an actuator for rotating the cam is increased, durability may deteriorate due to friction and wear of the component, and reliability of controlling a coolant may be degraded.

The present disclosure has been made in an effort to provide a coolant control valve unit having advantages of reducing operating torque of an actuator, reducing friction and wear of a component, and enhancing reliability of controlling a coolant by reducing friction and wear between a cam cover and a cam, and a cooling system having the same.

An embodiment of the present invention provides a coolant control valve unit including: a cam having at least one upper surface to which a driving axle is connected and a lower surface having a sloped surface with a profile set in a rotation direction on the basis of the driving axle; a valve provided in a rod supported on one side of the sloped surface; an actuator rotating the driving axle to push the rod along the profile of the sloped surface of the cam to cause the valve to open and close a coolant passage; a cam cover supporting an upper surface of the cam; and an annular cam bearing interposed between the cam cover and the cam, excluding a central region in which the driving axle is formed.

The driving axle may penetrate through the cam cover.

A rotating shaft bearing and a watertight gasket may be interposed between the cam cover and the driving axle.

A mounting surface allowing the cam bearing to be mounted thereon may be formed on a lower surface of the cam cover along a circumference centering on the driving axle.

A rib in direct contact with the cam bearing may protrude from an upper surface of the cam, to correspond to the mounting surface.

The rib may include first and second ribs extending in a direction away from the driving axle and formed at a set angle in a rotation direction of the cam and a third rib extending in a rotation direction of the driving axle and connecting the first and second ribs.

The third rib may connect end portions of the first and second ribs in a direction in which the driving axle is disposed.

The rib may include a reinforcing rib extending from the third rib toward a rotation center where the driving axle is disposed.

The cam bearing may include a PTFE material.

Another embodiment of the present invention provides a cooling system having a coolant control valve unit controlling a coolant distributed to each cooling component of an engine, including: a cam having an upper surface to which a driving axle is connected and a lower surface having at least one sloped surface with a profile set in a rotation direction on the basis of the driving axle; a valve provided in a rod supported on one side of the sloped surface; an actuator rotating the driving axle to push the rod along the profile of the sloped surface of the cam to cause the valve to open and close a coolant passage; a cam cover supporting an upper surface of the cam; and an annular cam bearing interposed between the cam cover and the cam, excluding a central region in which the driving axle is formed.

The driving axle may penetrate through the center of the cam cover and a rotating shaft bearing and a watertight gasket may be interposed between the cam cover and the driving axle.

A mounting surface allowing the cam bearing to be mounted thereon may be formed on a lower surface of the cam cover along a circumference centering on the driving axle, and a rib in direct contact with the cam bearing may protrude from an upper surface of the cam, to correspond to the mounting surface.

The rib may include: first and second ribs extending in a direction away from the driving axle and formed at a set angle in a rotation direction of the cam; and a third rib extending in a rotation direction of the driving axle and connecting the first and second ribs.

The third rib may connect end portions of the first and second ribs in a direction in which the driving axle is disposed.

The rib may include a reinforcing rib extending from the third rib toward a rotation center where the driving axle is disposed, and connected to the driving axel.

DETAILED DESCRIPTION

Figure 1:
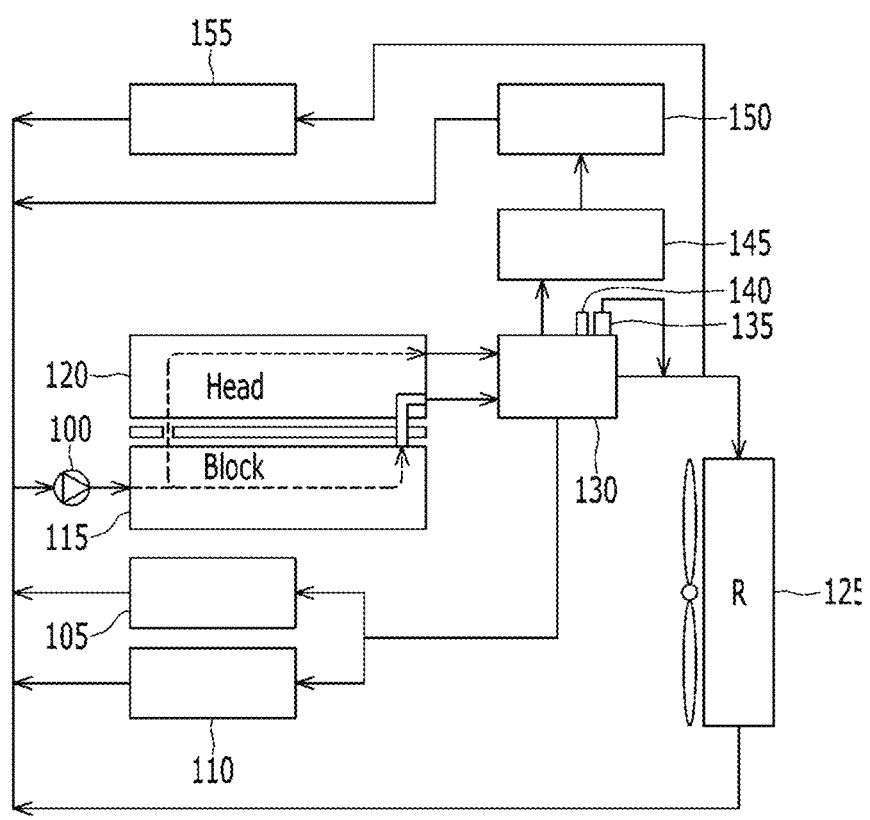
FIG. 1 is a view schematically illustrating an overall flow of a coolant in a cooling system having a coolant control valve unit.

Hereinafter, embodiments of the present invention will be described in detail with reference to the accompanying drawings.

In the drawings, sizes and thickness of components are arbitrarily shown for the description purposes, so the present invention is not limited to the illustrations of the drawings and thicknesses are exaggerated to clearly express various parts and regions.

The drawings and description are to be regarded as illustrative in nature and not restrictive, and like reference numerals designate like elements throughout the specification.

In the following descriptions, terms such as "first" and "second," etc., may be used only to distinguish one component from another as pertinent components are named the same, and order thereof is not limited.

Figure 3:
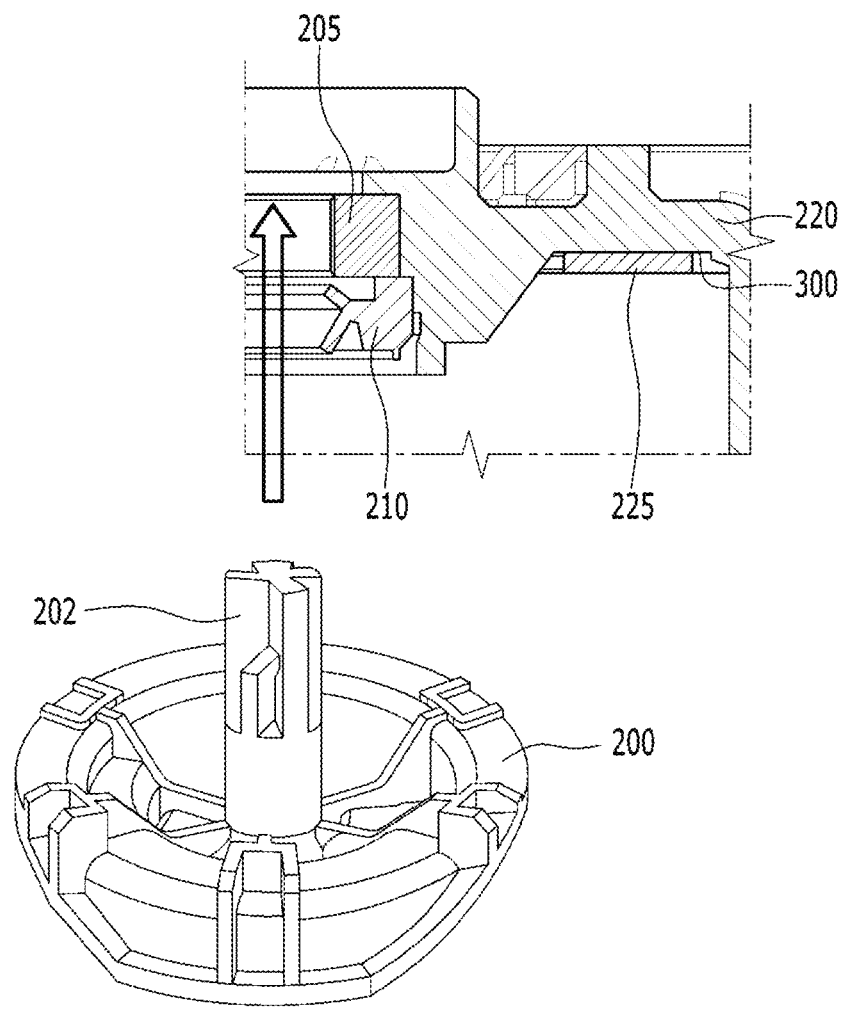
FIG. 3 is a cross-sectional view of one side of a cam cover provided in a coolant control valve unit according to an embodiment of the present invention.

An aspect of the present invention provides a coolant valve device for controlling coolant flow in a hybrid vehicle. The device comprises a cam 200 having an upper surface facing (top surface of ribs 401, 402, 403) a cam cover 220. The cam 200 is configured to rotate about an axis motor 310 operates. An annular cam bearing (bush) 225 is interposed between the upper surface of the cam 200 and a lower surface of cam cover 220 (FIG. 3). In embodiments, the bearing (bush) 225 contacts the cam 200 only at a top surfaces of ribs 401, 402, 403.

Driving axle 202 passes through the central hole of the bearing 225 such that mechanical connection between the motor 210 and the axle 202 is made within the central hole of the bearing 225 when viewed over the top. FIG. 1 is a view schematically illustrating an overall flow of a coolant in a cooling system having a coolant control valve unit.

Referring to FIG. 1, a cooling system includes a coolant pump 100, an exhaust gas recirculation (EGR) valve 105, an oil cooler 110, a cylinder block 115, a cylinder head 120, a radiator 125, a coolant control valve unit 130, a safety valve 135, a coolant temperature sensor 140, a low-pressure EGR cooler 145, a heater 150, and a reservoir tank 155.

The cylinder head 120 is disposed above the cylinder block 15, and the coolant control valve unit 130 is installed to be adjacent to a coolant outlet of the cylinder head 120.

The coolant pump 100 is installed to be adjacent to a coolant inlet of the cylinder block 115 to pump a coolant to one side of the cylinder block 115, and the pumped coolant flows within the cylinder head 120 and the cylinder block 115.

The coolant control valve unit 130 may receive a coolant discharged from the cylinder head 120 and the cylinder block 115 and control the supplied coolant.

Also, the coolant control valve unit 130 may control a coolant distributed to the low-pressure EGR cooler 145 and the heater 150, a coolant distributed to the radiator 125, and a coolant distributed to the EGR valve 105 and the oil cooler 110.

The coolant temperature sensor 140 may sense a temperature of a coolant discharged from the cylinder head 120 and the cylinder block 115 and supplied to the coolant control valve unit 130. When the coolant is overheated, the safety valve 135 may be operated by the temperature of the coolant to bypass the overheated coolant to the radiator 125.

An embodiment of the present invention relates to a structure of the cam type coolant control valve unit 130, and the cam type structure will be described with reference to FIG. 6. A rotary type structure may refer to a known art.

Also, structures and functions of the reservoir tank 155, the heater 150, the low-pressure EGR cooler 145, the coolant temperature sensor 140, the safety valve 135, the radiator 125, the EGR valve 105, the coolant pump 100, and the oil cooler 110 may refer to a known art.

Figure 2:
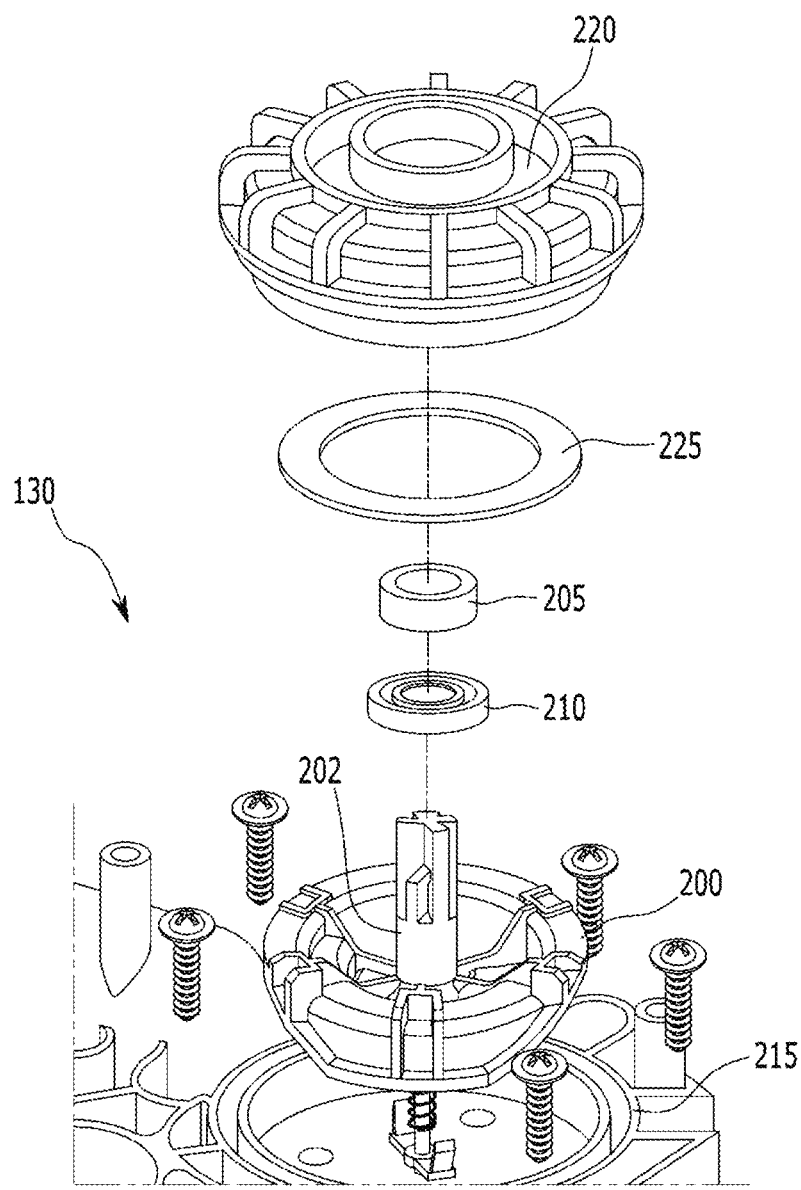
FIG. 2 is a partial exploded perspective view of a coolant control valve unit according to an embodiment of the present invention.

FIG. 2 is a partial exploded perspective view of a coolant control valve unit according to an embodiment of the present invention.

Referring to FIG. 2, the coolant control valve unit 130 includes an upper housing 215, a cam 200, a driving axle 202, a gasket 210, a shaft bearing 205, a cam cover 220, and a cam bearing 225.

The driving axle 202 is connected to a central portion of an upper surface of the cam 200, and the driving axle 202 may be rotated by a motor or an actuator 310 (see FIG. 6) such as a gear box.

The driving axle 202 may be disposed to penetrate through a central portion of the cam cover 220, and the gasket 210 and the shaft bearing 205 are interposed between the cam cover 220 and the driving axle 202.

The shaft bearing 205 serves to reduce rotation resistance when the driving axle 202 rotates, and the gasket 210 may serve to enhance water-tightness.

In an embodiment of the present invention, the cam bearing 225 is interposed between the cam cover 220 and an upper surface of the cam 200.

The cam bearing 225 may have a thin ring structure formed along a circle on the basis of the driving axle 202, and an upper surface of the cam bearing 225 is in contact with a lower surface of the cam cover 220 and a lower surface thereof is in contact with an upper surface of the cam 200. Also, in an embodiment, the cam bearing 225 may be formed of a PTFE material.

A coupling structure of the driving axle 202, the cam cover 220, the shaft bearing 205, and the gasket 210 may refer to FIG. 3.

FIG. 3 is a cross-sectional view of one side of a cam cover provided in a coolant control valve unit according to an embodiment of the present invention.

Referring to FIG. 3, the driving axle 202 penetrates through a central portion of the cam cover 220, and the shaft bearing 205 and the gasket 210 are interposed between the driving axle 202 and the cam cover 220. Here, the shaft bearing 205 is positioned above the gasket 210.

In the cam cover 220, a mounting surface 300 is formed on an outer lower surface with respect to a central portion of the cam cover 220 corresponding to the driving axle 202, and an upper surface of the cam bearing 225 is in contact with the mounting surface 300.

The mounting surface 300 and the upper surface of the cam bearing 225 may have a smoothing and flat structure, reducing friction and enhancing wear resistance. Also, a lower surface of the cam bearing 225 may have a smooth and flat structure.

Also, the mounting surface 300 may be formed in a recess (no reference numeral is given) depressed upwards from the lower surface of the cam cover 220, effectively preventing the cam bearing 225 from being released.

Figure 4:
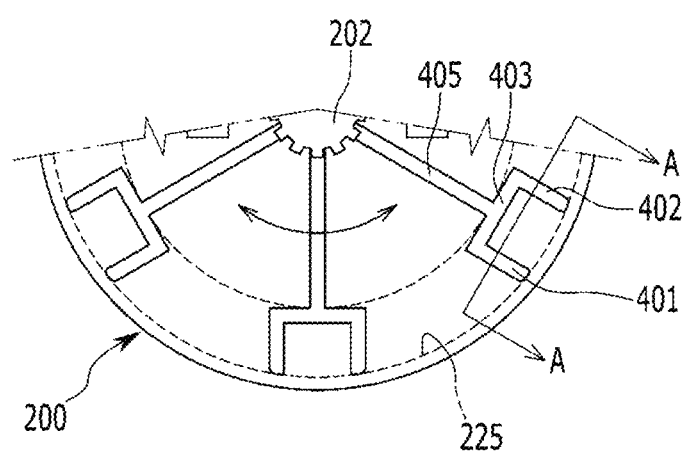
FIG. 4 is a partial plan view of a cam provided in a coolant control valve unit according to an embodiment of the present invention.

FIG. 4 is a partial plan view of a cam provided in a coolant control valve unit according to an embodiment of the present invention.

Referring to FIG. 4, a rib is provided on an upper surface of the cam 200. The ribs include a first rib 401, a second rib 402, and a third rib 403, and these ribs protrude upwards from the upper surface of the cam 200.

The first rib 401 and the second rib 402 are formed at an edge portion on an upper surface of the cam 200, extend outwards from a rotation central portion at a set distance, and are disposed at a set interval in a rotation direction of the cam 200.

The third rib 403 extends in the rotation direction of the cam 200 and connects inner end portions of the first and second ribs 401 and 402. Also, a reinforcing rib 405 is formed on the upper surface of the cam 200. One end of the reinforcing rib 405 is connected to the second rib 402 and the other end thereof extends toward the rotation center in which the driving axle 202 is disposed.

In an embodiment of the present invention, upper surfaces of the first, second, and third ribs 401, 402, and 403 may be in contact with the lower surface of the cam bearing 225.

Figure 5:
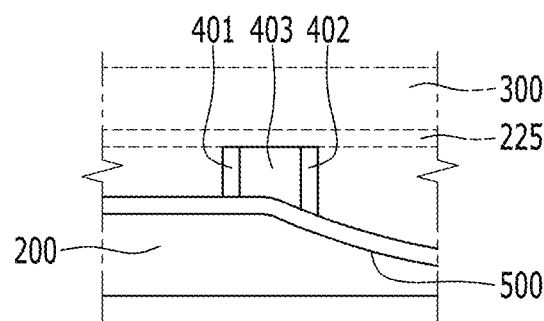
FIG. 5 is a partial side view of a cam provided in a coolant control valve unit according to an embodiment of the present invention.

FIG. 5 is a partial side view of a cam provided in a coolant control valve unit according to an embodiment of the present invention.

Referring to FIG. 5, the cam bearing 225 is disposed under the mounting surface 300 of the cam cover 220, and the first, second, and third ribs 401, 402, and 403 are disposed on a lower surface of the cam bearing 225.

Here, the first, second, and third ribs 401, 402, and 403 and the reinforcing rib 405 may be integrally formed on the upper surface of the cam 200.

A sloped surface 500 having a set profile is formed on a lower surface of the cam 200. According to a rotating operation of the cam 200, a rod 502 (see FIG. 6) to which the sloped surface 500 corresponds may be pushed downwards. A person skilled in the art may also express a distance over which the cam 200 pushes the rod 502 downwards, as "a lift or a lift height".

Figure 6:
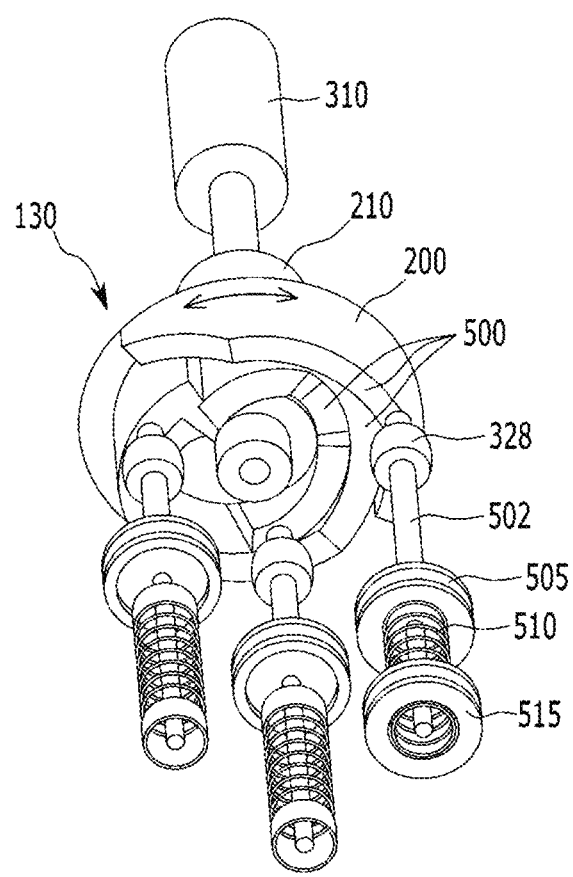
FIG. 6 is a partial perspective view illustrating an operational principle of a coolant control valve unit according to an embodiment of the present invention.

FIG. 6 is a partial perspective view illustrating an operational principle of a coolant control valve unit according to an embodiment of the present invention.

Referring to FIG. 6, the coolant control valve unit 130 includes the actuator 310, the cam 200, the sloped surface 500, the sealing member 328, the rod 502, the valve 505, an elastic member 510, and a support member 515, as key components.

The sloped surface 500 is formed on a lower surface of the cam 200 in a rotation direction with respect to a rotation central axis, and here, the sloped surface 500 is formed in three rows.

An upper end of the rod 502 is in contact witheach of the three sloped surfaces 500, and the cam 200 is rotated by the actuator 310. As the cam 200 rotates, the rod 502 is moved downwards by the sloped surfaces 500.

The valve 505 is fixed to one side of the rod 502 to open and close a coolant passage according to a movement of the rod 502, and the elastic member 510 elastically supports a lower surface of the valve 505 toward the lower surface of the cam 200. Also, a lower end of the elastic member 510 is supported by the support member 515.

As described above, the cam bearing 225 is interposed between the cam cover 220 and the cam 200, and the cam bearing 225 may effectively reduce friction and wear according to rotation of the cam 200.

here, since the mounting surface 300 and the upper surface of the cam bearing 225 are smooth and flat, friction may be reduced, wear resistance may be enhanced, and operating torque of the actuator 310 may be reduced.

Also, the ribs formed on the upper surface of the cam 200 slid with respect to the cam bearing, and such ribs may effectively reduce a frictional area formed with the cam bearing 225.

In addition, the reinforcing rib 405 may enhance structural strength of the cam and enhance durability of the first, second, and third ribs 401, 402, and 403.

While this invention has been described in connection with certain embodiments, it is to be understood that the invention is not limited to the disclosed embodiments, but, on the contrary, is intended to cover various modifications and equivalent arrangements included within the spirit and scope of the appended claims.

What is claimed is:
1. A coolant control valve unit comprising:
 a cam having an upper surface to which a driving axle is connected and a lower surface having at least one sloped surface with a profile set in a rotation direction on the basis of the driving axle;
 a valve provided in a rod supported on one side of the sloped surface;
 an actuator rotating the driving axle to push the rod along the profile of the sloped surface of the cam to cause the valve to open and close a coolant passage;

a cam cover supporting an upper surface of the cam; and an annular cam bearing interposed between the cam cover and the cam, excluding a central region in which the driving axle is formed, wherein a mounting surface allowing the cam bearing to be mounted thereon is formed on a lower surface of the cam cover along a circumference centering on the driving axle, a rib in direct contact with the cam bearing protrudes from an upper surface of the cam, to correspond to the mounting surface, and the cam bearing has an annular plate shape.

2. The coolant control valve unit of claim 1, wherein:
the driving axle penetrates through the cam cover.

3. The coolant control valve unit of claim 1, wherein:
a rotating shaft bearing and a watertight gasket are interposed between the cam cover and the driving axle.

4. The coolant control valve unit of claim 1, wherein the rib includes:
first and second ribs extending in a direction away from the driving axle and formed at a set angle in a rotation direction of the cam; and
a third rib extending in a rotation direction of the driving axle and connecting the first and second ribs.

5. The coolant control valve unit of claim 4, wherein:
the third rib connects end portions of the first and second ribs in a direction in which the driving axle is disposed.

6. The coolant control valve unit of claim 4, wherein:
the rib includes a reinforcing rib extending from the third rib toward a rotation center where the driving axle is disposed.

7. The coolant control valve unit of claim 1, wherein:
the cam bearing includes a PTFE material.

8. A cooling system having a coolant control valve unit controlling a coolant distributed to each cooling component of an engine, the cooling system comprising:
a cam having an upper surface to which a driving axle is connected and a lower surface having at least one sloped surface with a profile set in a rotation direction on the basis of the driving axle;

a valve provided in a rod supported on one side of the sloped surface;

an actuator rotating the driving axle to push the rod along the profile of the sloped surface of the cam to cause the valve to open and close a coolant passage;

a cam cover supporting an upper surface of the cam; and an annular cam bearing interposed between the cam cover and the cam, excluding a central region in which the driving axle is formed, wherein a mounting surface allowing the cam bearing to be mounted thereon is formed on a lower surface of the cam cover along a circumference centering on the driving axle, a rib in direct contact with the cam bearing protrudes from an upper surface of the cam, to correspond to the mounting surface, and the cam bearing has an annular plate shape.

9. The cooling system of claim 8, wherein:
the driving axle penetrates through the center of the cam cover and a rotating shaft bearing and a watertight gasket are interposed between the cam cover and the driving axle.

10. The cooling system of claim 8, wherein:
the rib includes:
first and second ribs extending in a direction away from the driving axle and formed at a set angle in a rotation direction of the cam; and
a third rib extending in a rotation direction of the driving axle and connecting the first and second ribs.

11. The cooling system of claim 10, wherein:
the third rib connects end portions of the first and second ribs in a direction in which the driving axle is disposed.

12. The cooling system of claim 10, wherein:
the rib includes a reinforcing rib extending from the third rib toward a rotation center where the driving axle is disposed, and connected to the driving axle.

\* \* \* \* \*